(12) United States Patent
Yasui et al.

(10) Patent No.: US 7,017,723 B2
(45) Date of Patent: Mar. 28, 2006

(54) ELECTROMAGNETIC CLUTCH AND ROTATION TRANSMISSION DEVICE

(75) Inventors: Makoto Yasui, Shizuoka (JP); Koji Sato, Shizuoka (JP); Yoshitaka Nagano, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/872,381

(22) Filed: Jun. 22, 2004

(65) Prior Publication Data

US 2004/0226797 A1 Nov. 18, 2004

Related U.S. Application Data

(62) Division of application No. 10/144,039, filed on May 14, 2002, now Pat. No. 6,769,524.

(30) Foreign Application Priority Data

May 15, 2001 (JP) ............................. 2001-144721
May 15, 2001 (JP) ............................. 2001-144731

(51) Int. Cl.
 *B60K 23/08* (2006.01)
(52) U.S. Cl. ........................... 192/38; 192/46; 192/84.7
(58) Field of Classification Search .................. 192/35, 192/38, 40, 41 A, 44, 70.12, 84.1, 84.9, 113.3, 192/113.34, 84.7
See application file for complete search history.

(56) References Cited

U.S. PATENT DOCUMENTS

| | | | |
|---|---|---|---|
| 2,919,000 A | 12/1959 | Claytor | 192/84.8 |
| 3,123,169 A * | 3/1964 | Young et al. | 180/247 |
| 3,300,002 A | 1/1967 | Roper | 192/35 |
| 4,030,581 A | 6/1977 | Giometti | 192/16 |
| 4,499,980 A | 2/1985 | Kaminski et al. | 192/35 |
| 4,966,265 A | 10/1990 | Wiese et al. | 192/35 |
| 5,232,076 A * | 8/1993 | Nakagawa et al. | 192/84.941 |
| 5,265,707 A | 11/1993 | Abe et al. | 192/47 |
| 5,348,126 A | 9/1994 | Gao | 192/223.2 |
| 5,366,419 A * | 11/1994 | Oda | 475/160 |
| 5,431,413 A | 7/1995 | Hajzler | 277/317 |
| 5,458,420 A | 10/1995 | Otto | 384/448 |
| 5,611,545 A | 3/1997 | Nicot | 277/402 |
| 5,622,437 A | 4/1997 | Alff | 384/448 |
| 5,924,510 A * | 7/1999 | Itoh et al. | 180/197 |
| 5,952,908 A * | 9/1999 | Kubo | 336/192 |
| 5,971,123 A | 10/1999 | Ochab et al. | 192/48.2 |
| 6,244,403 B1 | 6/2001 | Ito et al. | 192/35 |
| 6,276,506 B1 * | 8/2001 | Kubo | 192/84.961 |
| 6,460,671 B1 * | 10/2002 | Karambelas et al. | 192/36 |

(Continued)

FOREIGN PATENT DOCUMENTS

JP 11-105576 A * 4/1999

(Continued)

*Primary Examiner*—Saul Rodriguez
(74) *Attorney, Agent, or Firm*—Wenderoth, Lind & Ponack, L.L.P.

(57) ABSTRACT

The magnetic attraction force of an electromagnetic coil in an electromagnetic clutch is increased in a limited installation space, thereby improving reliability of operation. The dimensions of a field core housing the electromagnetic coil and a rotor are optimized to increase the magnetic attraction force. The thicknesses of cylindrical portions on the inner-diameter side of the field core and the rotor have larger thicknesses than those of cylindrical portions on its outer-diameter side so that the sectional areas of both cylindrical portions will be equal to each other. Also, a rotation transmission device provided with an electromagnetic clutch is proposed which can avoid deterioration of its sealing property and damage to its bearing and avoid cost increase.

9 Claims, 10 Drawing Sheets

U.S. PATENT DOCUMENTS 6,536,570 B1 * 3/2003 Ito et al. .................. 192/35
6,766,888 B1 * 7/2004 Yasui et al. ............... 192/35
6,769,524 B1 * 8/2004 Yasui et al. ............... 192/35
6,834,750 B1 * 12/2004 Baker et al. .............. 192/44

FOREIGN PATENT DOCUMENTS

JP  2002-39220 A  *  2/2005
JP  2003-301865 A  *  10/2005

* cited by examiner

ELECTROMAGNETIC CLUTCH AND ROTATION TRANSMISSION DEVICE

This application is a divisional application of Ser. No. 10/144,039, filed May 14, 2002 now U.S. Pat. No. 6,769,524, now allowed.

BACKGROUND OF THE INVENTION

This invention relates to an electromagnetic clutch which couples and uncouples two rotary shafts under an electromagnetic force. It also relates to a rotation transmission device provided with such an electromagnetic clutch for carrying out changeover of transmission and shutoff of a driving force in a drive line of various machines and vehicles.

An electromagnetic clutch is used as a device for connecting and disconnecting power in a power transmission line to selectively change over transmission and shutoff of power in various machines and vehicles, such as front and rear wheels of a 4WD car.

FIGS. 9–12 show a conventional rotation transmission device provided with an electromagnetic clutch.

Figure 9:
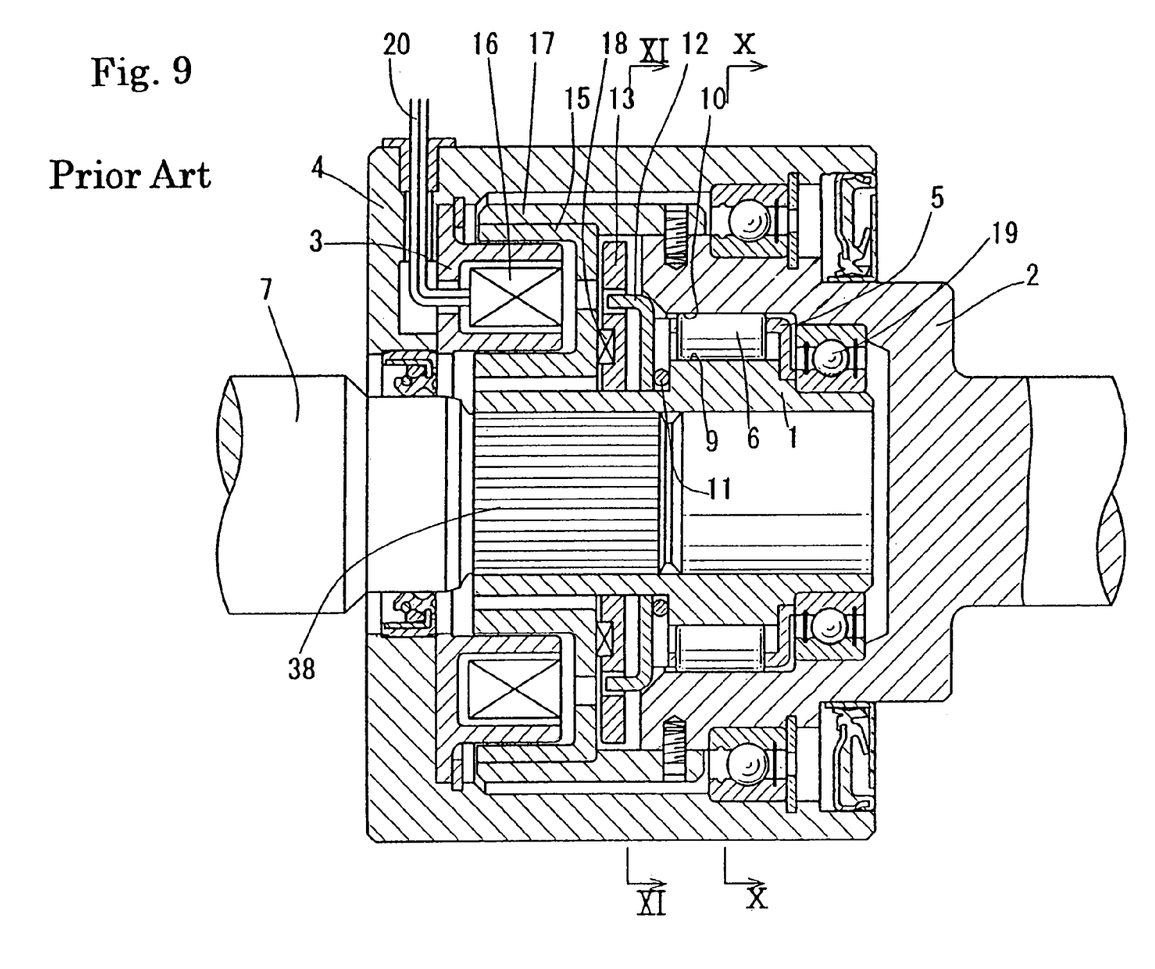
FIG. 9 is a sectional view of a prior art device.
Figure 10:
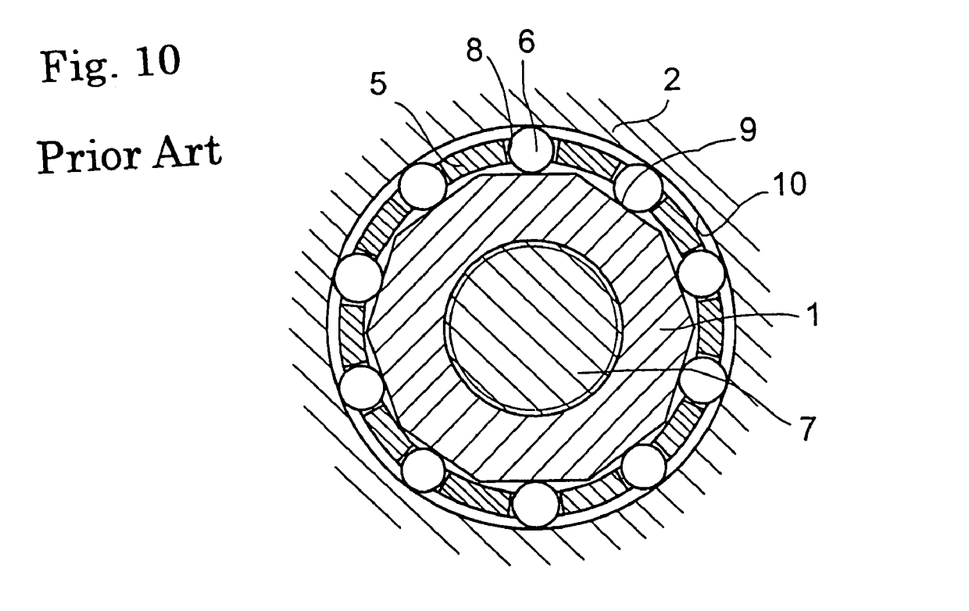
FIG. 10 is is sectional view along line X—X of FIG. 9.
Figure 11:
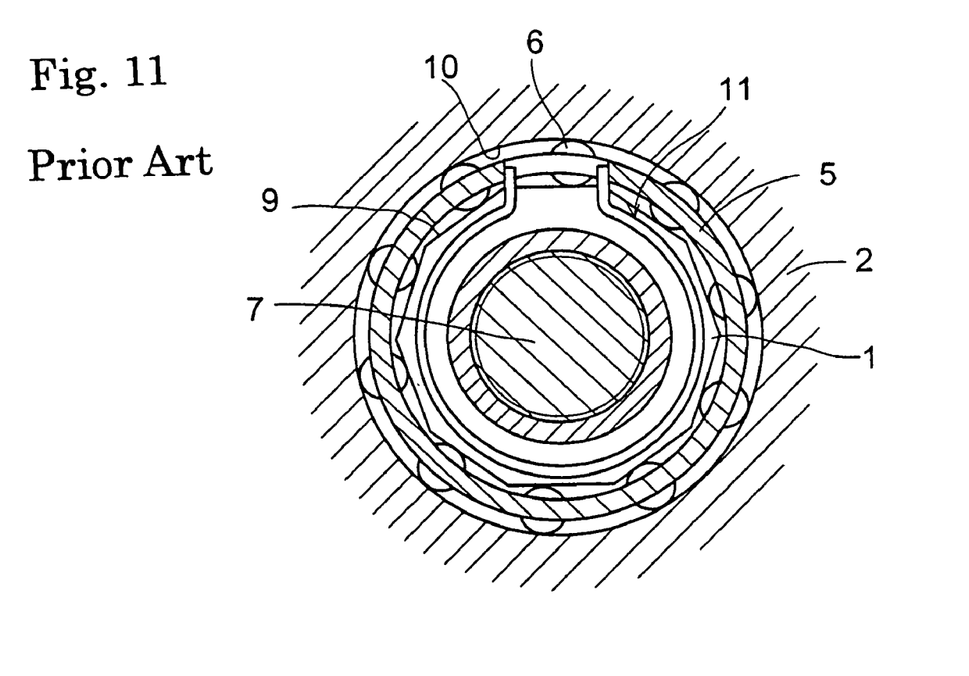
FIG. 11 is is sectional view along line XI—XI of FIG. 9.

The device has an inner member (inner ring) 1 coupled through a serration 38 to an input shaft 7 so as to rotate together, and has an outer member (outer ring) 2 rotatably mounted concentrically around the inner member 1. A plurality of cam surfaces 9 are formed on the inner member 1, while a cylindrical surface 10 is formed on the outer member 2 to define an annular space between these surfaces. A retainer 5 is provided in the annular space, and rollers 6 performing as engaging elements are retained in a plurality of pockets 8 formed in the retainer 5 to mount the rollers in the annular space. A switch spring 11 is engaged between the retainer 5 and the inner member 1 to bias the retainer 5 to a neutral position where the rollers 6 do not engage the cylindrical surface 10 or the cam surfaces 9.

By changing the phase of the retainer 5, the rollers 6 will engage and disengage between the inner member 1 and the outer member 2. This arrangement forms a clutch.

The electromagnetic clutch portion comprises a rotor 15 having a ⊐-shaped section and fixed to a cylindrical rotor support 17 formed of a nonmagnetic material, and comprises an armature 13 provided at one end of the retainer 5 so as to be axially movable but relatively nonrotatable. The rotor 15 and armature 13 are arranged with a suitable gap kept therebetween by a separating spring 18. An electromagnetic coil 16 for pressing the rotor 15 and the armature 13 against each other by a magnetic force is nonrotatably arranged in the rotor 15 through a field core 3 fixed to the housing 4. By turning on and off a current to the electromagnetic coil 16, the rollers 6 are engaged and disengaged between the inner member 1 and the outer member 2.

When a current to the electromagnetic coil 16 is off, the rollers 6 are biased by the switch spring 11 through the retainer 5 to their neutral position on the cam surfaces 9 formed on the inner member 1, so that the inner member 1 and the outer member 2 can idle.

When it is desired to engage the inner member 1 with the outer member 2, a current is supplied to the electromagnetic coil 16. The armature 13 coupled to the retainer 5 is attracted by magnetic force toward and pressed against the rotor 15.

Frictional torque due to pressing acts between the retainer 5 and the outer member 2 through the armature 13 and the rotor 15. When the inner member 1 and the outer member 2 rotate relative to each other, the frictional torque overcomes the torque of the switch spring 11, so that the retainer 5 and the rollers 6 as the engaging elements rotate with the outer member 2. As a result, the rollers 6 as the engaging elements move from the neutral positions on the cam surfaces to wedge-engagement positions where the inner member 1 and the outer member 2 are engaged together and driven.

Figure 12:
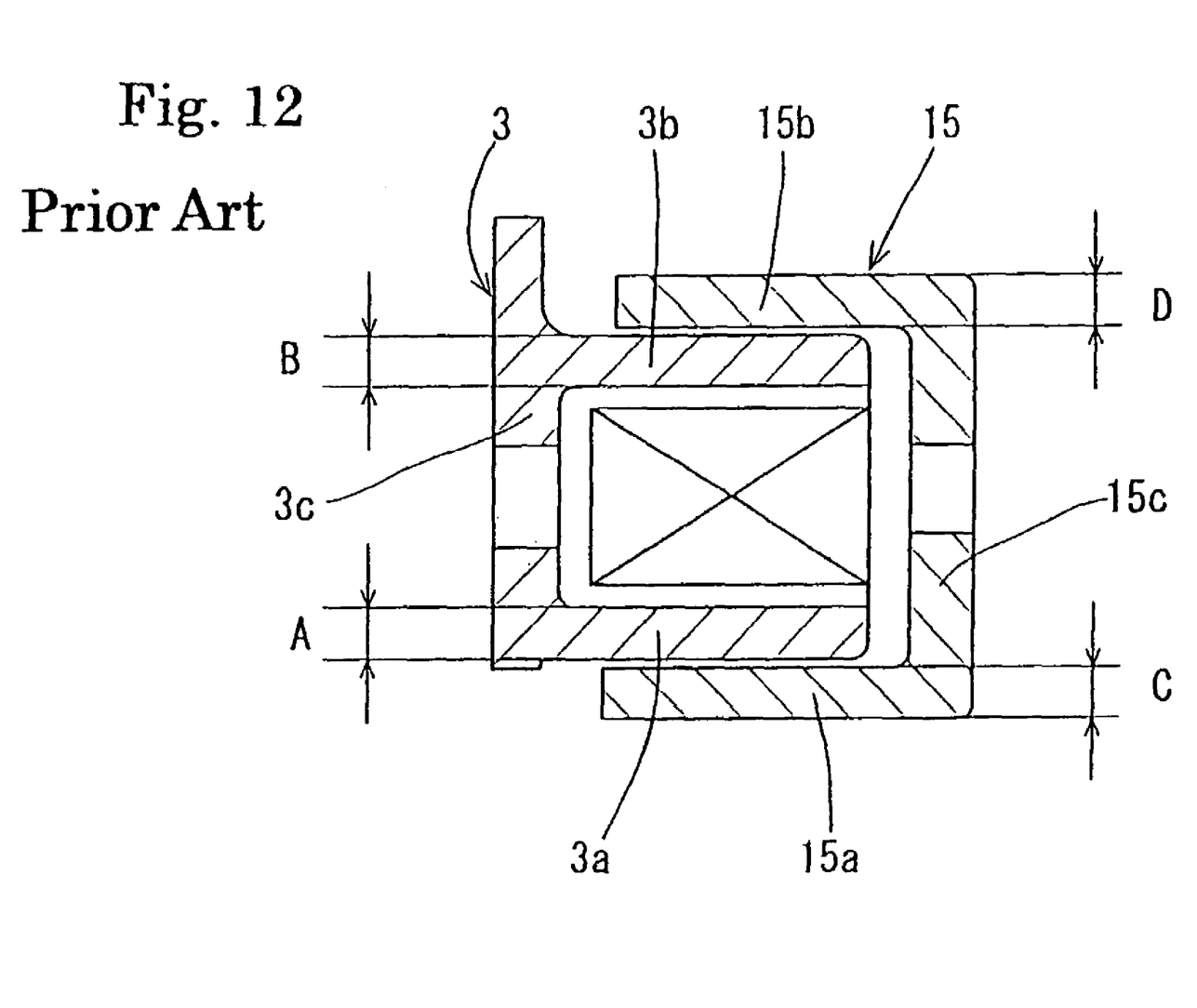
FIG. 12 is an enlarged view of the rotor portion of the device of FIG. 9.

The rotor 15 of such an electromagnetic clutch comprises cylindrical portions 15a and 15b formed on the inner-diameter and outer-diameter sides, respectively, and a disk portion 15c that opposes the armature 13 (FIG. 12).

The field core 3 for mounting the electromagnetic coil 16 comprises cylindrical portions 3a and 3b formed on its inner-diameter and outer-diameter sides, respectively, and an end face portion 3c through which it is fixed to the housing 4.

A lead wire 20 for supplying a current to the electromagnetic coil 16 is led out of the field core 3 through the end face portion 3c of the field core 3 out of the housing 4.

As described above, since an electromagnetic clutch is engaged by the attraction force produced by the electromagnetic coil 16, if the attraction force is weak, the armature 13 and the rotor 15 may be kept separate from each other, so that the clutch may not be engaged.

Thus, it is desired to ensure engagement of the clutch by increasing the magnetic attraction force of the electromagnetic coil 16 as much as possible, thereby improving reliability of operation.

But in many applications, the space for installing the electromagnetic clutch portion in the housing 4 is limited, so that the ability to increase the size of the electromagnetic coil 16 is limited.

Thus, a first object of this invention is to increase the magnetic attraction force of the electromagnetic coil as much as possible in a limited installation space, thereby improving reliability of operation.

Figure 13:
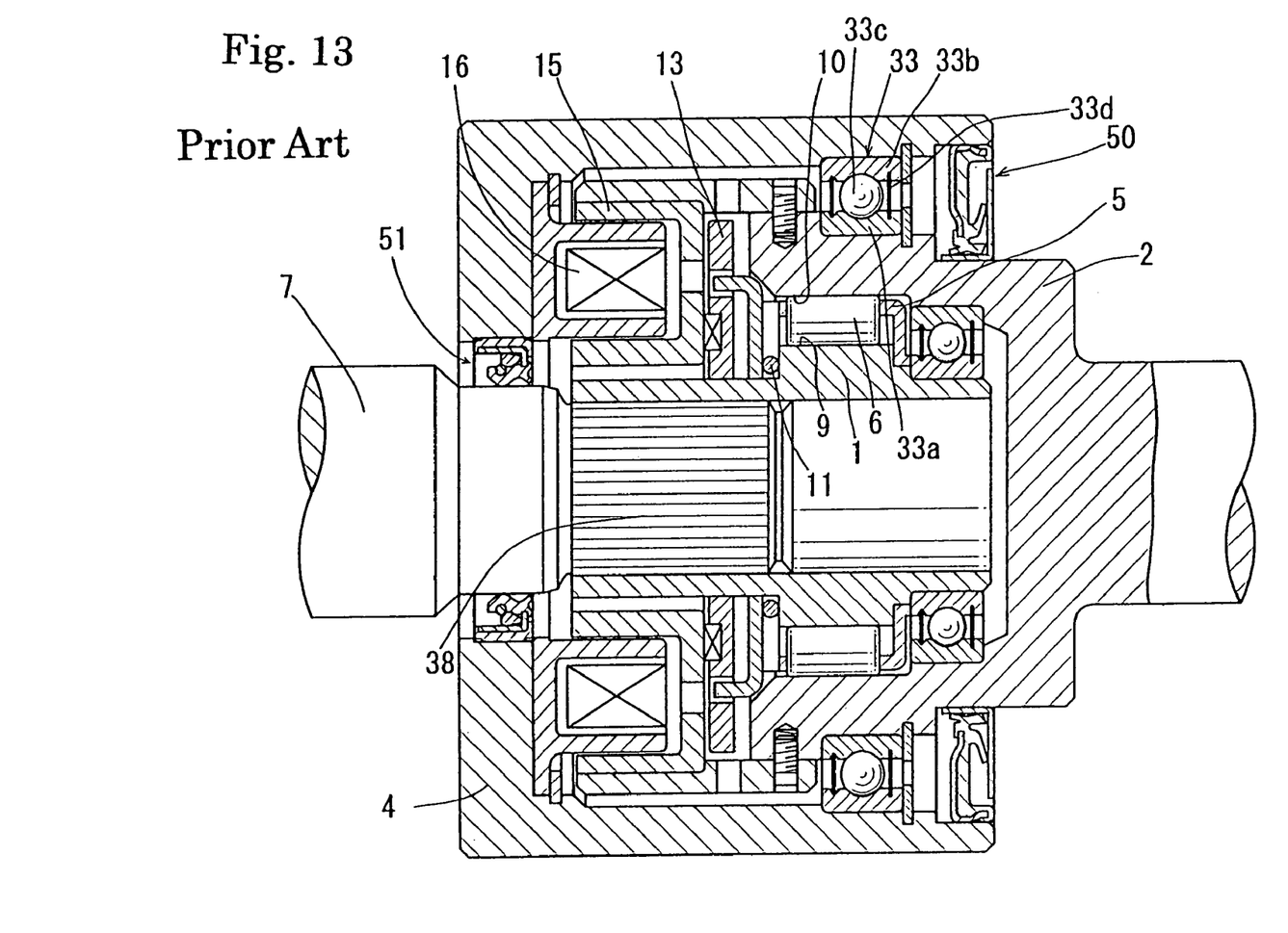
FIG. 13 is a sectional view of another prior art device.

FIG. 13 shows another conventional rotation transmission device.

In this prior art device, the housing 4 and the outer member 2 are supported through a bearing 33, and entry of foreign matter into the rotation transmission device is prevented by sealing devices 50, 51 provided at both ends of the housing 4.

As the sealing device 50, which is provided on the open side of the housing, a combination of a sealing plate such as a slinger and a sealing lip is used. The sealing device 50 is pressed into the end face of the housing 4 on its open side.

Thus, if during operation the housing 4 and the outer member 2 are displaced relative to each other in the axial direction due to rattling, and the sealing plate of the sealing device 50 protrudes outside through the opening of the housing 4, the sealing properties may deteriorate.

Under use conditions where there are many flying stones, if the sealing device 50 is located at the end face of the housing 4 on its open side, a flying stone may hit, for example the sealing plate of the sealing device 50, thus deforming it and deteriorating the sealing property.

Also, in this rotation transmission device, a bearing 33, which supports the outer member 2 and the housing 4, is provided on the outer peripheral side of the portion forming the clutch. The bearing 33 comprises an inner ring 33a, an outer ring 33b and a plurality of rolling elements 33c. When the clutch engages, the rollers 6 engage the outer member 2 and the inner member 1, so that the outer diameter of the outer member 2, which forms the clutch, increases. This increases the load acting between the inner ring 33a and the rolling elements 33c of the bearing 33, so that if the interference between the outer ring 2 and the bearing 33 is large, the bearing 33 may be damaged.

Also, in conventional rotation transmission devices, grease is sealed by providing sealing members 33d on both sides of the inner ring 33a and the outer ring 33b of the bearing 33. However, separately carrying out lubrication of the bearing 33 and lubrication of the clutch portion causes costs to increase.

Thus, a second object of this invention is to prevent deterioration of sealing, damage to the bearing and cost increase in the rotation transmission device.

SUMMARY OF THE INVENTION

According to this invention, in order to solve the first object, the dimensions of the field core are optimized to increase the magnetic attraction force of the electromagnetic coil as much as possible.

Heretofore, the field core 3 was formed by press molding, and as shown in the enlarged view of FIG. 12, the thickness A of the cylindrical portion 3a on the inner-diameter side of the field core 3 had the same thickness as the thickness B of the cylindrical portion 3b on the outer-diameter side. Thus, if the sectional area of the cylindrical portion 3a on the inner-diameter side is compared with that of the cylindrical portion 3b on the outer-diameter side, the sectional area of the cylindrical portion 3a on the inner-diameter side is smaller, so that magnetic saturation tends to occur in only part of the cylindrical portion 3a on the inner-diameter side. Magnetic efficiency is thus bad.

According to this invention, the thickness A of the cylindrical portion 3a on the inner-diameter side of the field core 3 is larger than the thickness B of the cylindrical portion 3b on the outer-diameter side. In other words, the relation A>B is met so that the sectional areas of both cylindrical portions 3a, 3b are equal to each other, and thus the magnetic flux density distribution is uniform. By making the magnetic flux density distribution uniform, a magnetic circuit is formed efficiently, so that a large electromagnetic force is obtained in a limited installation space.

Similarly, in this invention, the dimensions of the rotor are also optimized to increase the magnetic attraction force of the electromagnetic coil as much as possible. Heretofore, as shown in FIG. 12, in the rotor 15 too, the thickness C of the cylindrical portion 15a on the inner-diameter side had the same thickness as the thickness D of the cylindrical portion 15b on the outer-diameter side. That is, they meet the relation C=D. Thus, the sectional area of the cylindrical portion 15a on the inner-diameter side is smaller than that of the cylindrical portion 15b on the outer-diameter side, so that magnetic saturation tends to occur only in part of the cylindrical portion 15a on the inner-diameter side, thus worsening magnetic efficiency.

According to this invention, the thickness C of the cylindrical portion 15a on the inner-diameter side is larger than the thickness D of the cylindrical portion 15b on the outer-diameter side, i.e. the relation C>D is met so that the sectional areas of cylindrical portions 15a and 15b are equal to each other, thus making the magnetic flux density distribution uniform.

Further, according to this invention, the wall thickness of the end face portion 3c forming the field core 3 is equal to or larger than that of the cylindrical portion 3a on the inner-diameter side to prevent magnetic saturation at the inner-diameter portion of the end face portion 3c and make the magnetic flux density distribution uniform.

Also, according to this invention, in order that misengagement will not occur at the electromagnetic clutch portion due to viscous resistance of grease that stays between the rotor 15 and the armature 13, grease discharge holes 21 are formed in the outer periphery of the attraction surfaces of the rotor 15 and the armature 13.

Further, heretofore, the lead wire that supplies current to the electromagnetic coil 16 was pulled out of the field core 3 through the end face portion 3c of the field core 3 and was directly pulled out of the housing 4 to outside. Thus, if the lead wire 20 is pulled by accident, the mounting portion of the lead wire to the field core 3 may be broken.

In view of this possibility, according to this invention, a lead wire 20 that has been led out into the housing 4 through the end face portion 3c of the field core 3 is wound on a cylindrical portion in the housing and its end is pulled out of the housing so that the tension of the lead wire 20 will not directly act on the mounting portion of the lead wire 20 to the field core 3.

Also, according to this invention, in order to solve the second object, a sealing device for preventing entry of foreign matter into the housing is provided between the housing and at least one of the inner member and the outer member, and the sealing device is recessed from an end face of the housing, thereby preventing deterioration of sealability.

By recessing the sealing device from the end face of the housing, even if the housing and the outer member become displaced relative to each other due, for example, to axial rattling, it is possible to prevent the seal plate of the sealing device from protruding to the outside through the opening of the housing.

Also, by recessing the sealing device from the end face of the housing, flying stones are less likely to hit the sealing device, so that it is possible to lessen damage to the sealing device itself.

Further, by providing a shield plate outside of the sealing device, it is possible to protect the sealing device against foreign matter such as flying stones, mud and grass.

Also, the sealing device may comprise two annular sealing plates each having an L-shaped section, having a cylindrical portion, and having an upright plate portion, and a sealing lip.

On the open side of the housing, a bearing sealing member for sealing the bearing may be provided and a sealing member on the opposite side of the housing may be omitted. This reduces the cost of the bearing sealing member itself. Also, due to the fact that the bearing portion and the clutch forming portion communicate with each other, grease for the bearing portion and grease for the clutch forming portion can be used in common.

Also, if the bearing is formed of an outer ring, an inner ring and a plurality of spherical rolling elements, and if the bearing is arranged on the outer-diameter side of the outer member as the clutch forming portion, by setting the interference between the bearing and the outer member such that when a predetermined torque is loaded on the clutch, the contact stress at the center of the contact points between the inner ring of the bearing and the rolling elements will be 4200 MPa or below, and it is possible to prevent damage to the bearing.

In the rotation transmission device of this invention, either rollers or sprags may be used as the engaging elements.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Hereinbelow, the first embodiment of the rotation transmission device provided with the electromagnetic clutch according to this invention will be described with reference to FIGS. 1–4.

For elements that are identical to those in the prior art devices shown in FIGS. 9–13, identical numerals will be used.

Figure 1:
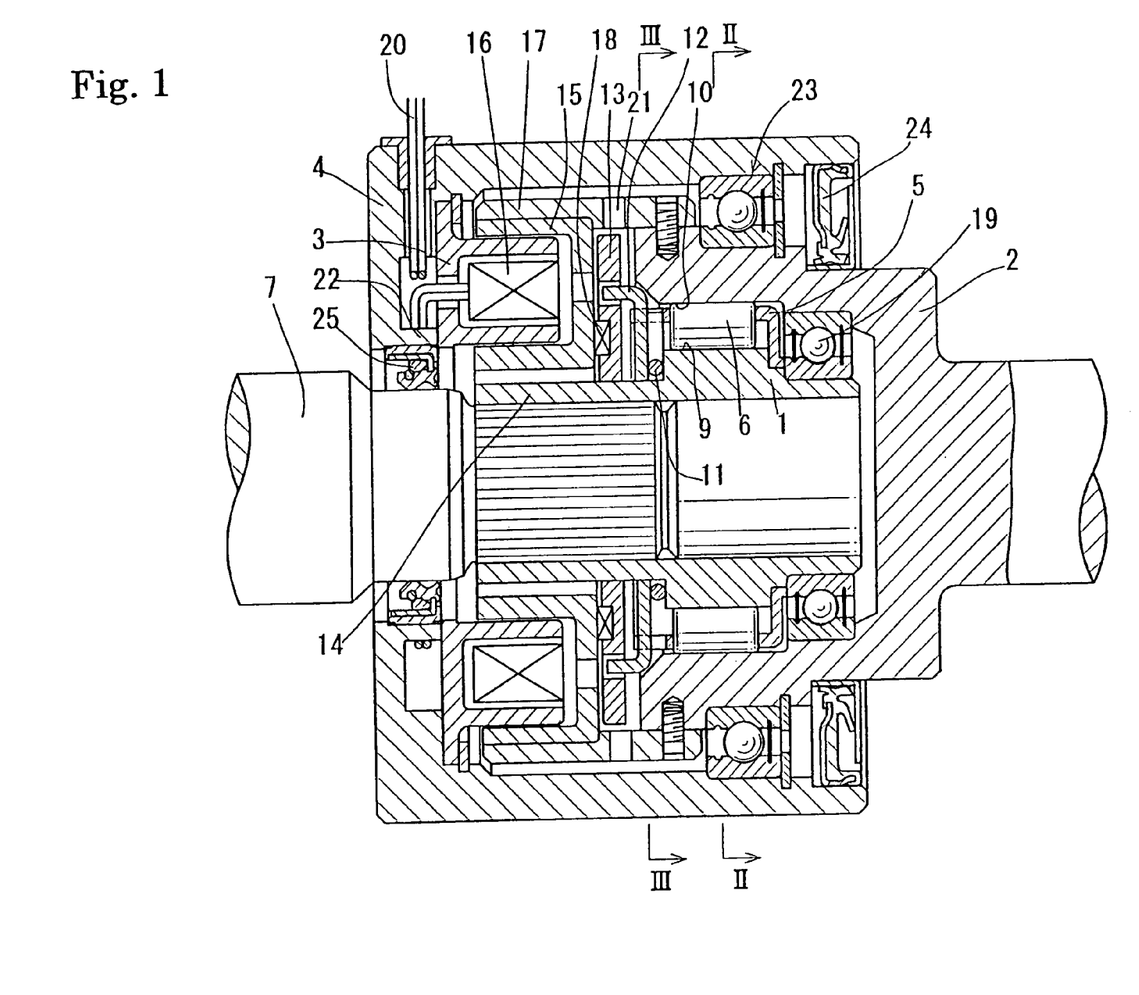
FIG. 1 is a sectional view of a first embodiment according to this invention.
Figure 2:
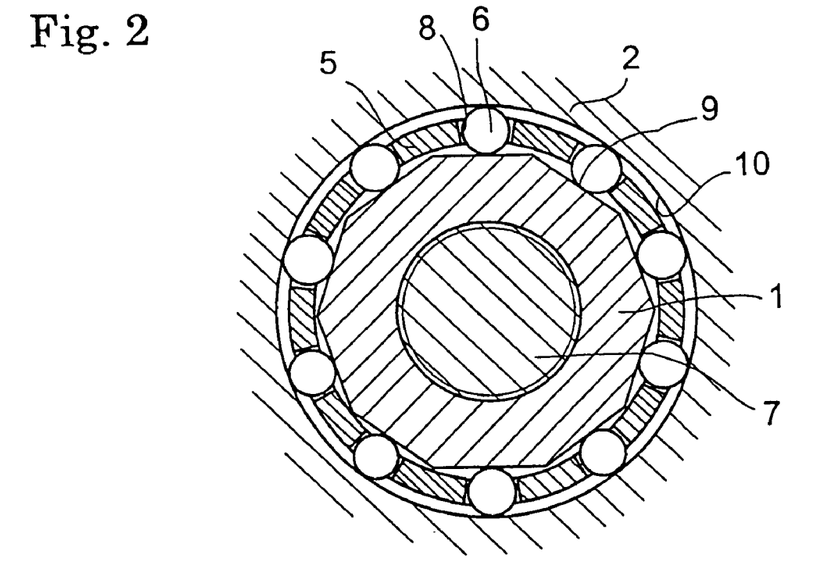
FIG. 2 is a sectional view along line II—II of FIG. 1.
Figure 3:
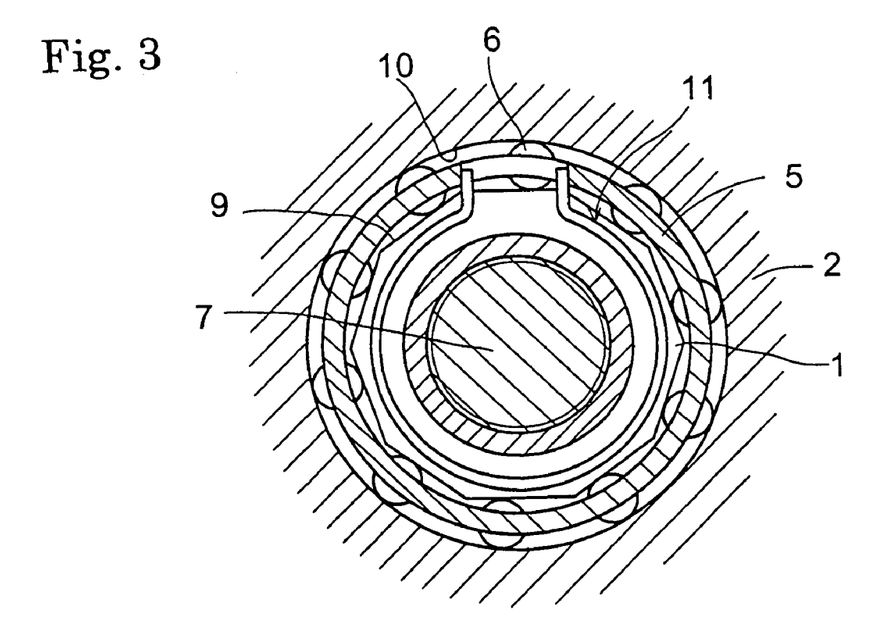
FIG. 3 is a sectional view along line III—III of FIG. 1.

The rotation transmission device provided with an electromagnetic clutch shown in FIG. 1 comprises an inner member 1, an outer member 2 mounted concentrically on the inner member 1, and a housing 4 supporting the outer member 2 through a bearing 23. An input shaft 7 is fitted in the inner member 1 by serrations, a plurality of cam surfaces 9 are formed on the outer periphery of the inner member 1, and a cylindrical surface 10 is formed on the inner periphery of the outer member 2 to form an annular wedge-shaped space between the cam surfaces 9 on the inner member 1 and the cylindrical surface 10 on the outer member 2.

A retainer 5 is provided in the wedge-shaped space. Rollers 6 acting as engaging elements are mounted in a plurality of pockets 8 formed in the retainer 5. A switch spring 11 is provided to bias the retainer 5 to a neutral position where the rollers 6 do not engage the cylindrical surface 10 or the cam surfaces 9. By changing the phase of the retainer 5, the rollers 6 will engage and disengage the inner member 1 and the outer member 2.

The retainer 5 has both ends supported by the inner member 1 through a support plate 12 so as to be pivotable in the rotational direction and not to be slidable in the axial direction. Two cutouts are formed in one end of the retainer 5. Two claws integrally formed on the support plate 12 engage the cutouts and are bent toward an armature 13. The bent tips of the claws are loosely fitted in slits formed in the disk-like armature 13, so that the armature and the support plate 12 are non-rotatable but axially slidable relative to each other.

The armature 13 has its inner peripheral surface guided by a cylindrical guide shaft portion 14 formed integrally on the inner member 1 so as to be movable relative to the guide shaft portion 14 of the inner member 1 both in the axial and rotational direction.

A rotor 15 is fixed to the outer member 2 through a rotor support 17 made of a nonmagnetic material such as aluminum.

The armature 13 is adjacent to the rotor 15 through a suitable gap. An electromagnetic coil 16 is provided to press the rotor 15 and the armature 13 against each other by electromagnetic force.

Between the armature 13 and the rotor 15, a so-called separating spring 18 is provided to avoid close contact between the armature 13 and the rotor 15 to provide a gap therebetween when current to the electromagnetic coil 16 is off.

When current to the electromagnetic coil 16 is off, the retainer 5 and the rollers 6 are biased by the switch spring 11 to neutral positions on the cam surfaces 9 formed on the inner member 1, so that the inner member 1 and the outer member 2 are not engaged. When it is desired to engage the inner member 1 with the outer member 2, by energizing the electromagnetic coil 16, the armature 13, which is coupled to the retainer 5 through the support plate 12, is attracted by electromagnetic force toward and pressed against the rotor 15, which is fixed to the outer member 2.

Frictional torque due to the pressing acts on the retainer 5 and the outer member 2 through the armature 13 and the rotor 15. When the inner member 1 and the outer member 2 rotate relative to each other, the frictional torque overcomes the torque of the switch spring 11, so that the retainer 5 and the rollers 6 as the engaging elements rotate together with the outer member 2. As a result, the rollers 6 move from the neutral positions on the cam surfaces 9 to wedge engagement positions, so that the inner member 1 and the outer member 2 are driven into engagement with each other.

A bearing 19 is provided between the inner member 1 and the outer member 2.

In this embodiment, the housing 4 and the outer member 2 are supported through a bearing 23, and entry of foreign matter into the rotation transmission device is prevented by sealing devices 24, 25 provided at both ends of the housing 4.

For the sealing device 24 provided at the open side of the housing 4, a combination of a sealing plate such as a slinger and a sealing lip is used.

For the purpose of increasing the magnetic attraction force of the electromagnetic coil 16 as much as possible, the dimensions of the field core 3 are optimized.

Figure 4:
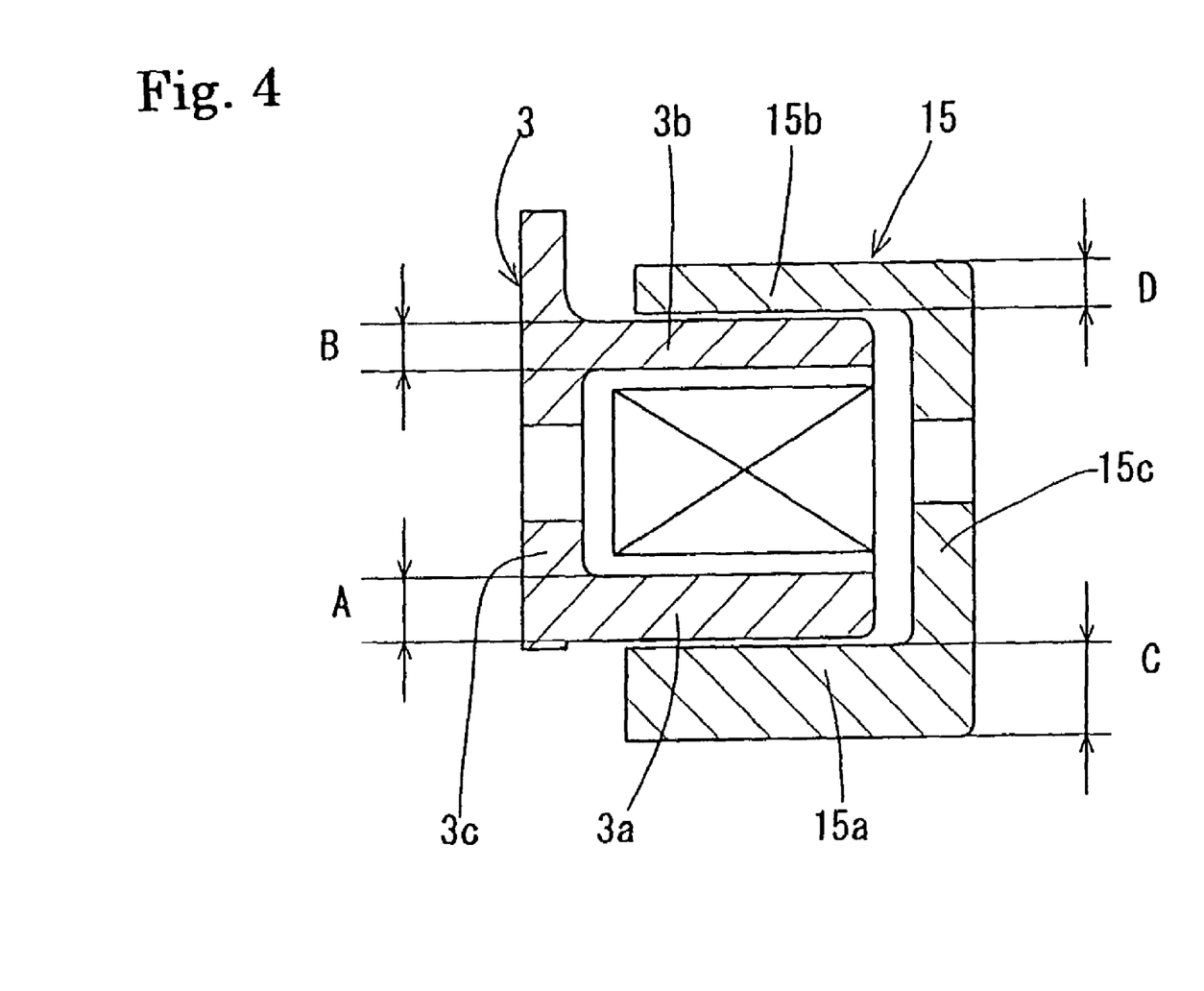
FIG. 4 is an enlarged view of the rotor portion of the same.

As shown in an enlarged view of FIG. 4, by making the thickness A of the cylindrical portion 3a on the inner-diameter side of the field core 3 larger than the thickness B of the cylindrical portion 3b on its outer-diameter side so that the relation A>B is met, the sectional areas (volumes) of the cylindrical portions 3a and 3b are made equal, so that the magnetic flux density distribution is made uniform. By this arrangement, a magnetic circuit is formed efficiently, so that a large electromagnetic force is obtained.

Similarly, by optimizing the dimensions of the rotor 15, the magnetic attraction force of the electromagnetic coil 16 can be increased. That is, as shown in an enlarged view of FIG. 4, by making the thickness C of the cylindrical portion 15a on the inner-diameter side of the rotor 15 larger than the thickness D of the cylindrical portion 15b on its outer-diameter side so that the relation C>D is met, the sectional areas (volumes) of the cylindrical portions 15a and 15b are made equal, so that the magnetic flux density distribution is made uniform.

On the other hand, if the wall thickness of the disk portion 15c of the rotor 5, which opposes the armature 13, is increased, magnetic flux will not flow to the armature 13, but instead much magnetic flux will flow to pillar portions between slits formed in the disk portion 15c. Thus, the wall thickness of the disk portion 15c is preferably not thicker than needed to obtain required mechanical strength.

Further, by making the wall thickness of the end face portion 3c, which forms the field core 3, equal to or larger than the wall thickness of the cylindrical portion 3a on the inner-diameter side, occurrence of magnetic saturation at the inner-diameter portion of the end face portion 3c is prevented and the magnetic flux density distribution is made uniform.

Also, a grease discharge hole 21 is formed in the rotor support 17 at the outer side of the suction surfaces between the rotor 15 and the armature 13 so that grease will not stay between the rotor 15 and the armature 13 to prevent misengagement from occurring at the electromagnetic clutch portion due to viscous resistance of the grease.

Further, a lead wire 20 led out through the end face portion 3c of the field core 3 into the housing 4 is wound on a cylindrical portion 22 inside the housing 4, and its end is pulled out of the housing 4 to prevent the tension of the lead wire 20 from directly acting on the portion at which the lead wire 20 is connected to the field core 3.

Next, a second embodiment of the rotation transmission device provided with an electromagnetic clutch according to this invention will be described with reference to FIGS. 5–8.

This embodiment is basically the same as the first embodiment in structure and function. Thus the description is omitted except for points which are different.

Figure 5:
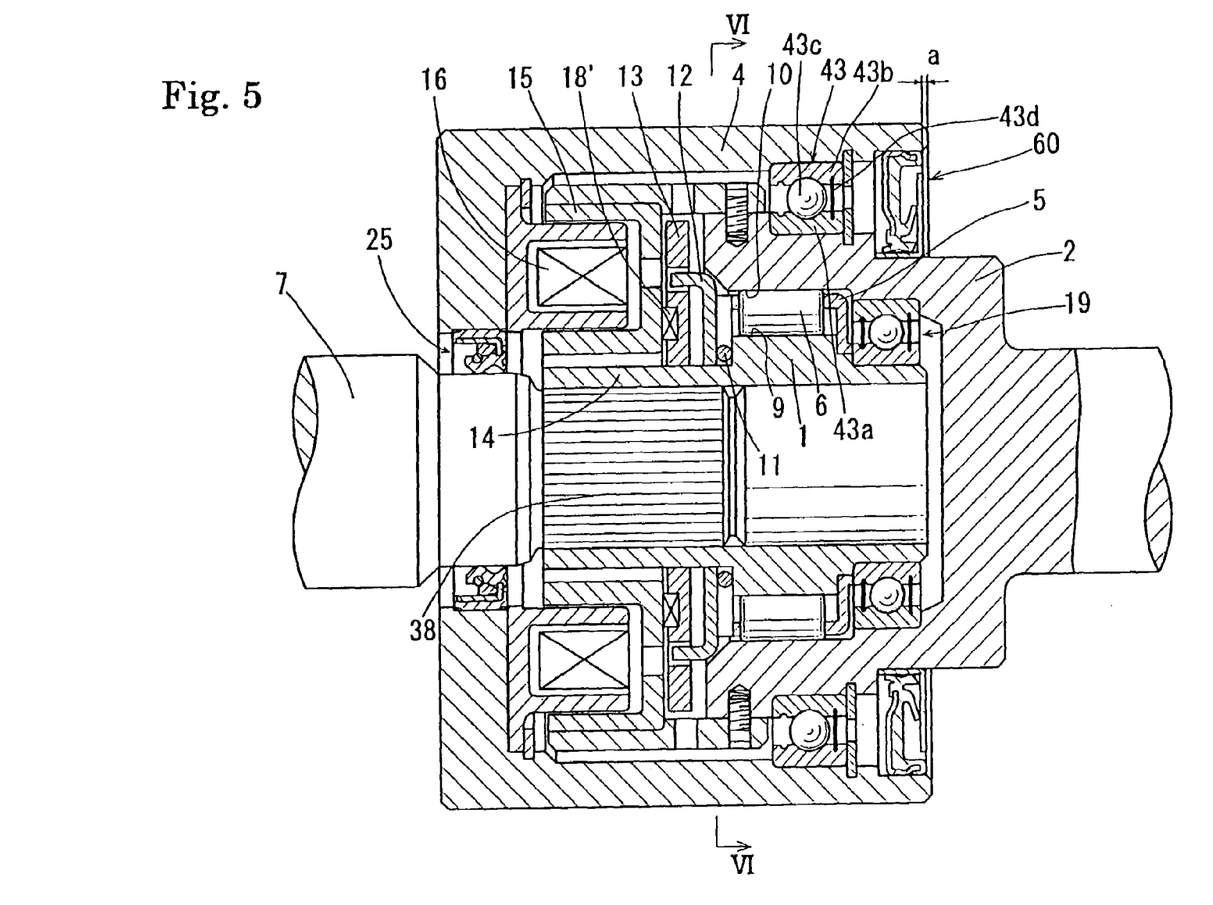
FIG. 5 is a sectional view of a second embodiment.
Figure 6:
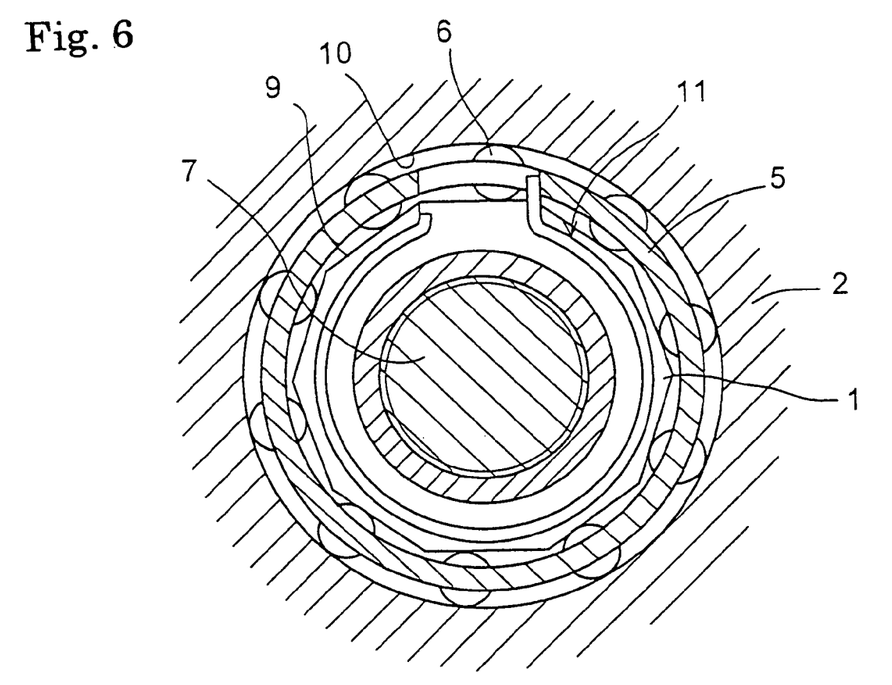
FIG. 6 is a sectional view along line VI—VI of FIG. 5.

Between the armature 13 and the rotor 15, a so-called corrugated spring 18' is arranged to provide a gap between the armature 13 and the rotor 15 when current to the electromagnetic coil 16 is off.

A bearing 19 is provided between the inner member 1 and the outer member 2.

In this embodiment, the housing 4 and the outer member 2 are supported through a bearing 43. Entry of foreign matter into the rotation transmission device is prevented by sealing devices 25, 60 provided at both ends of the housing 4.

For the sealing device 60, which is provided on the opening side of the housing 4, a combination of a sealing plate such as a slinger and a sealing lip is used.

Figure 7:
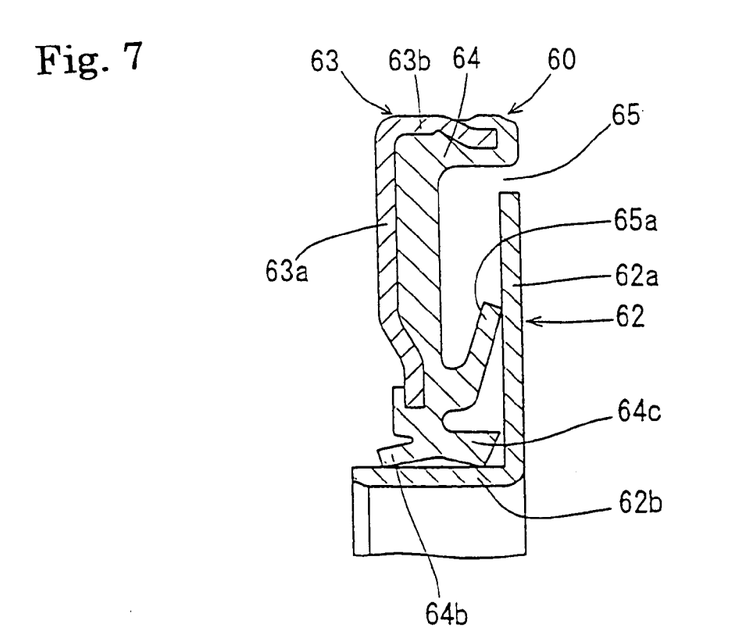
FIG. 7 is an enlarged view of the sealing device of the same.

As shown in FIG. 7, the sealing device 60 has a sealing plate 62 on the inner peripheral side and a sealing plate 63 on the outer peripheral side. The sealing plate 62 is formed into an L shape in section and comprises a cylindrical portion 62b pressed onto the outer peripheral surface of the outer member 2 and an upright plate portion 62a. The sealing plate 63 is formed into an L shape in section and comprises a cylindrical portion 63b pressed into the inner surface of the end of the housing 4 on its open side and an upright plate portion 63a. The upright plate portion 62a of the sealing plate 62 and the upright plate portion 63a of the sealing plate 63 oppose each other.

A resilient member 64, such as rubber which is integrated with the sealing plate 63 on the outer peripheral side, is provided with a side lip 65a and two radial lips 64b, 64c as sealing lips. The side lip 65a and the radial lips 64b, 64c are in sliding contact with the upright plate portion 62a and the cylindrical portion 62b of the sealing plate 62 on the inner peripheral side, respectively. The upright plate portion 62a of the sealing plate 62 opposes the cylindrical portion 63b of the sealing plate 63 on the outer peripheral side with a slight diametric gap to form a labyrinth seal 65.

The sealing device 60 is recessed inwardly from the end face of the housing 4 to form a step a (FIG. 5).

By recessing the sealing device 60 from the end face of the housing 4, even if the housing and the outer member 2 are displaced in the axial direction due to rattling, it is possible to prevent the sealing plate 62 of the sealing device 60 from protruding through the opening. Thus it is possible to effectively prevent entry of foreign matter. Thus, sealing properties improve.

Also, by providing the sealing device 60 so as to be recessed from the end face of the housing 4, it is possible to prevent flying stones from hitting the sealing device and thus to lessen damage to the sealing device 60 itself.

In this embodiment, the bearing 43 supporting the outer member 2 and the housing 4 is provided on the outer periphery of the clutch forming portion. The bearing 43 comprises an inner ring 43a and an outer ring 43b. The interference between the bearing 43 and the outer member 2 is determined such that when a predetermined torque is applied to the clutch-forming portion, the contact stress at the center of the contact portions of the inner ring 43a and the rolling elements 43c of the bearing 43 will be 4200 MPa or under, which is a standard value in bearing design to prevent damage to the bearing.

Only on the side of bearing 43 closest to the open side of the housing 4, a bearing sealing member 43d for sealing the bearing 43 is provided. By omitting a sealing member on the opposite side of the housing 4, the cost of the bearing sealing members is reduced, and also the cost reduction is achieved because the interior of the bearing 43 communicates with the clutch-forming portion, so that grease for the bearing 43 and grease for the clutch-forming portion are used in common.

Figure 8:
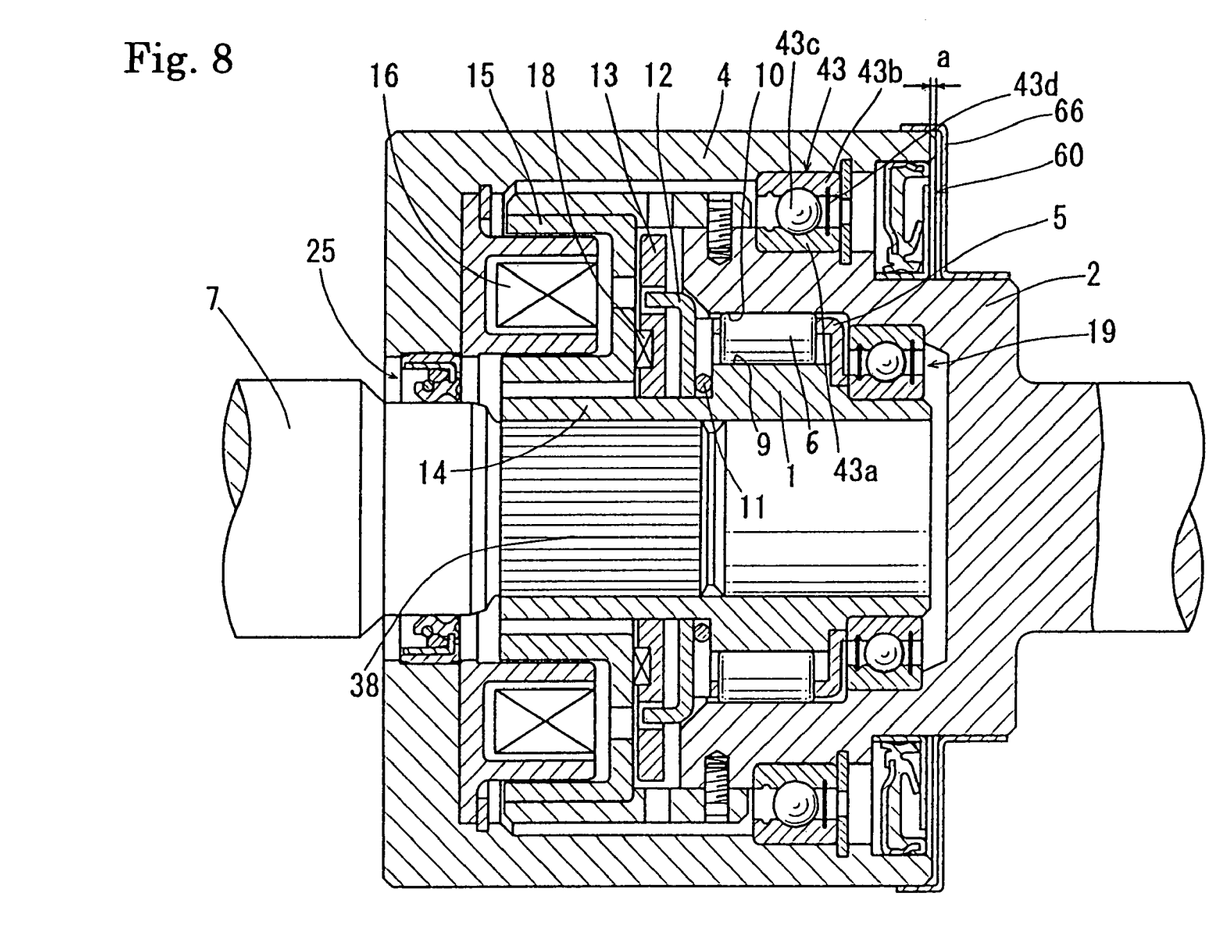
FIG. 8 is a sectional view of a third embodiment.

Next, FIG. 8 shows a third embodiment according to this invention. In this embodiment, a shield plate 66 covering the sealing device 60 is fixed to the outer peripheral surface of the outer member 2 on the outer side of the sealing device 60. The shield plate 66 protects the sealing device 60 against foreign matter such as flying stones, mud and grass.

This invention is applicable not only to the roller type clutch described above, but also to a sprag type clutch in which sprags are used as the engaging elements. The sprags are retained by a pair of retainers provided between the cylindrical outer surface of the inner member 1 and the cylindrical inner surface of the outer member 2, with one retainer fixed and the other retainer for controlling the angle of the sprags, thereby changing over forward and reverse rotations. Effects similar to those of the roller type clutch can be obtained.

According to the present invention, it is possible to increase the magnetic attraction force of the electromagnetic force in the electromagnetic clutch as much as possible in a limited installation space and improve reliability of operation.

Also, according to this invention, it is possible to prevent deterioration in sealing properties, damage to the bearing, and the cost increase in the rotation transmission device.

What is claimed is:

1. An electromagnetic clutch comprising:
an inner member;
an outer member rotatably and concentrically mounted around said inner member;
a retainer mounted between said inner member and said outer member;
engaging elements retained by said retainer;
an armature arranged at one end of said retainer so as to rotate together with said retainer;
a field core;
an electromagnetic coil mounted in said field core; and
a rotor fixed to one of said outer member and said inner member for attracting and releasing said armature by energizing and de-energizing said electromagnetic coil, said field core and said rotor each having cylindrical portions on inner and outer peripheral sides thereof, said cylindrical portion on said inner peripheral side of each of said field core and said rotor having a thickness larger than a thickness of said cylindrical portion on said outer peripheral side of each of said field core and said rotor such that magnetic flux density distributions of said field core and said rotor are uniform, a sectional area of said cylindrical portion on said inner peripheral side of said field core being equal to a sectional area of said cylindrical portion on said outer peripheral side of said field core, and a sectional area of said cylindrical portion on said inner peripheral side of said rotor being equal to a sectional area of said cylindrical portion on said outer peripheral side of said rotor.

2. The electromagnetic clutch of claim 1, wherein a wall thickness of an end face portion connecting ends of said cylindrical portion on said inner peripheral side of said field core and said cylindrical portion on said outer peripheral side of said field core is equal to or greater than a wall thickness of said cylindrical portion on said inner peripheral side of said field core, and a wall thickness of an end face portion connecting ends of said cylindrical portion on said inner peripheral side of said rotor and said cylindrical portion on said outer peripheral side of said rotor is equal to or greater than a wall thickness of said cylindrical portion on said inner peripheral side of said rotor.

3. The electromagnetic clutch of claim 1, wherein said engaging elements comprise rollers.

4. The electromagnetic clutch of claim 1, wherein a grease discharge hole is located outside of a point where said armature is attracted to said rotor.

5. The electromagnetic clutch of claim 4, wherein a wall thickness of an end face portion connecting ends of said cylindrical portion on said inner peripheral side of said field core and said cylindrical portion on said outer peripheral side of said field core is equal to or greater than a wall thickness of said cylindrical portion on said inner peripheral side of said field core, and a wall thickness of an end face portion connecting ends of said cylindrical portion on said inner peripheral side of said rotor and said cylindrical portion on said outer peripheral side of said rotor is equal to or greater than a wall thickness of said cylindrical portion on said inner peripheral side of said rotor.

6. The electromagnetic clutch of claim 4, wherein said engaging elements comprise rollers.

7. The electromagnetic clutch of claim 1, further comprising a lead wire connected to said electromagnetic coil so as to supply current to said electromagnetic coil for excitation, said lead wire being wound on an outer periphery of said cylindrical portion of said housing and extending out of said housing.

8. The electromagnetic clutch of claim 7, wherein a wall thickness of an end face portion connecting ends of said cylindrical portion on said inner peripheral side of said field core and said cylindrical portion on said outer peripheral side of said field core is equal to or greater than a wall thickness of said cylindrical portion on said inner peripheral side of said field core, and a wall thickness of an end face portion connecting ends of said cylindrical portion on said inner peripheral side of said rotor and said cylindrical portion on said outer peripheral side of said rotor is equal to or greater than a wall thickness of said cylindrical portion on said inner peripheral side of said rotor.

9. The electromagnetic clutch of claim 7, wherein said engaging elements comprise rollers.

* * * * *